United States Patent
Thompson et al.

(10) Patent No.: US 12,265,853 B2
(45) Date of Patent: Apr. 1, 2025

(54) HYBRID-COMPUTING RESOURCE OPTIMIZATION

(71) Applicant: The Boeing Company, Chicago, IL (US)

(72) Inventors: Richard Joel Thompson, Huntsville, AL (US); Nam Hoang Nguyen, Anaheim, CA (US); Kristen Smith Williams, Madison, AL (US); Marna Kagele, Seattle, WA (US); John R. Lowell, Fairfax, VA (US)

(73) Assignee: The Boeing Company, Chicago, IL (US)

( * ) Notice: Subject to any disclaimer, the term of this patent is extended or adjusted under 35 U.S.C. 154(b) by 41 days.

(21) Appl. No.: 17/664,063

(22) Filed: May 19, 2022

(65) Prior Publication Data

US 2023/0376354 A1 Nov. 23, 2023

(51) Int. Cl.
*G06F 9/50* (2006.01)
*G06F 11/34* (2006.01)

(52) U.S. Cl.
CPC ........ *G06F 9/5033* (2013.01); *G06F 11/3495* (2013.01)

(58) Field of Classification Search
CPC .................... G06F 9/5033; G06F 11/3495
See application file for complete search history.

(56) References Cited

U.S. PATENT DOCUMENTS

| | | | | |
|---|---|---|---|---|
| 10,511,690 B1* | 12/2019 | Chatterjee | ............... | H04L 43/16 |
| 11,574,030 B1* | 2/2023 | Harrigan | ................ | G06N 10/60 |
| 2007/0027666 A1* | 2/2007 | Frankel | .................. | G01V 11/00 703/10 |
| 2008/0180445 A1* | 7/2008 | Peskin | .................... | G06T 11/20 345/440 |
| 2009/0276763 A1* | 11/2009 | Gulwani | ............. | G06F 9/44589 717/130 |

(Continued)

OTHER PUBLICATIONS

European Patent Office Extended Search Report, dated Jul. 27, 2023, regarding Application No. EP23172926.0, 8 pages.

(Continued)

*Primary Examiner* — Jorge A Chu Joy-Davila
(74) *Attorney, Agent, or Firm* — Yee & Associates, P.C.

(57) ABSTRACT

Arranging computational sub-tasks in a hybrid-computing environment is provided. The method comprises receiving input of a number of nodes, wherein each node represents a computational sub-task, and wherein the nodes are grouped into different sets according to differing computing resources used by the nodes. A computational objective is also received as well as initial data inputs and desired final outputs. A directed graph network is generated comprising the nodes and directed edges connecting the nodes. An optimization problem is then solved to determine a best path through the directed graph network for deriving the desired final outputs from the initial data inputs according to the computational objective. The best path comprises a subset of nodes and directed edges within the directed graph network. The best path to achieve the computational objective and estimated computational resources required for the best path are output to a user.

40 Claims, 12 Drawing Sheets

(56) References Cited

U.S. PATENT DOCUMENTS

| | | | | |
|---|---|---|---|---|
| 2013/0261965 | A1* | 10/2013 | Delling | H04L 45/12 |
| | | | | 701/527 |
| 2016/0036886 | A1* | 2/2016 | Ito | H04N 21/23439 |
| | | | | 709/219 |
| 2018/0307988 | A1* | 10/2018 | Fano | G06N 5/04 |
| 2019/0220298 | A1* | 7/2019 | Jiao | G06F 9/5077 |
| 2020/0084293 | A1* | 3/2020 | Chatterjee | G06F 18/2411 |
| 2020/0394544 | A1* | 12/2020 | Low | G16C 10/00 |
| 2021/0174237 | A1* | 6/2021 | Mentovich | G06F 9/4881 |
| 2022/0075660 | A1* | 3/2022 | Beare | G06F 9/5044 |
| 2022/0114177 | A1* | 4/2022 | Li | G06F 12/0871 |
| 2023/0229514 | A1* | 7/2023 | Pinho | G06N 10/80 |
| | | | | 718/104 |

OTHER PUBLICATIONS

Muntz R R et al: "Preemptive Scheduling of Real-Time Tasks on Multiprocessor Systems", Journal of the Association for Computing Machinery, ACM, New York, NY, US, vol. 17, No. 2, Apr. 1, 1970 (Apr. 1, 1970), pp. 324-338, XP058247754, ISSN: 0004-5411, DOI: 10.1145/321574.321586.

* cited by examiner

EXAMPLE ANALYSIS OUTPUTS

HYBRID-COMPUTING RESOURCE OPTIMIZATION

BACKGROUND INFORMATION

1. Field

The present disclosure relates generally to computing system, more specifically, to an automated method for determining an optimal arrangement of sub-processes in a computational task.

2. Background

New technologies such as quantum computers are emerging and beginning to realize actual hardware forms. These technologies may offer increased speed over classical ways of solving hard problems. However, the current quantum resources available are very low, and quantum hardware is currently very noisy, making robust computation difficult. Hybrid arrangements of classical and quantum computing resources have been identified as a means of leveraging the best capabilities of one resource versus another (i.e., using classical computing for some tasks and quantum computing for others).

Therefore, it would be desirable to have a method and apparatus that take into account at least some of the issues discussed above, as well as other possible issues.

SUMMARY

An illustrative embodiment provides a computer-implement method for arranging computational sub-tasks in a hybrid-computing environment. The method comprises receiving input of a number of nodes, wherein each node represents a computational sub-task, and wherein the nodes are grouped into different sets according to differing computing resources used by the nodes. A computational objective is also received as well as initial data inputs and desired final outputs. A directed graph network is generated comprising the nodes and directed edges connecting the nodes. An optimization problem is then solved to determine a best path through the directed graph network for deriving the desired final outputs from the initial data inputs according to the computational objective. The best path comprises a subset of nodes and directed edges within the directed graph network. The best path to achieve the computational objective and estimated computational resources required for the best path are output to a user.

Another illustrative embodiment provides a system for arranging computational sub-tasks in a hybrid-computing environment. The system comprises a storage device configured to store program instructions and one or more processors operably connected to the storage device and configured to execute the program instructions to cause the system to: receive input of a number of nodes, wherein each node represents a computational sub-task, and wherein the nodes are grouped into different sets according to differing computing resources used by the nodes; receive a computational objective; receive initial data inputs and desired final outputs; generate a directed graph network comprising the nodes and directed edges connecting the nodes; solve an optimization problem to determine a best path through the directed graph network for deriving the desired final outputs from the initial data inputs according to the computational objective, wherein the best path comprises a subset of nodes and directed edges within the directed graph network; and output to a user the best path to achieve the computational objective and estimated computational resources required for the best path.

Another illustrative embodiment provides a computer program product for arranging computational sub-tasks in a hybrid-computing environment. The computer program product comprises a computer-readable storage medium having program instructions embodied thereon to perform the steps of: receiving input of a number of nodes, wherein each node represents a computational sub-task, and wherein the nodes are grouped into different sets according to differing computing resources used by the nodes; receiving a computational objective; receiving initial data inputs and desired final outputs; generating a directed graph network comprising the nodes and directed edges connecting the nodes; solving an optimization problem to determine a best path through the directed graph network for deriving the desired final outputs from the initial data inputs according to the computational objective, wherein the best path comprises a subset of nodes and directed edges within the directed graph network; and outputting to a user the best path to achieve the computational objective and estimated computational resources required for the best path.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
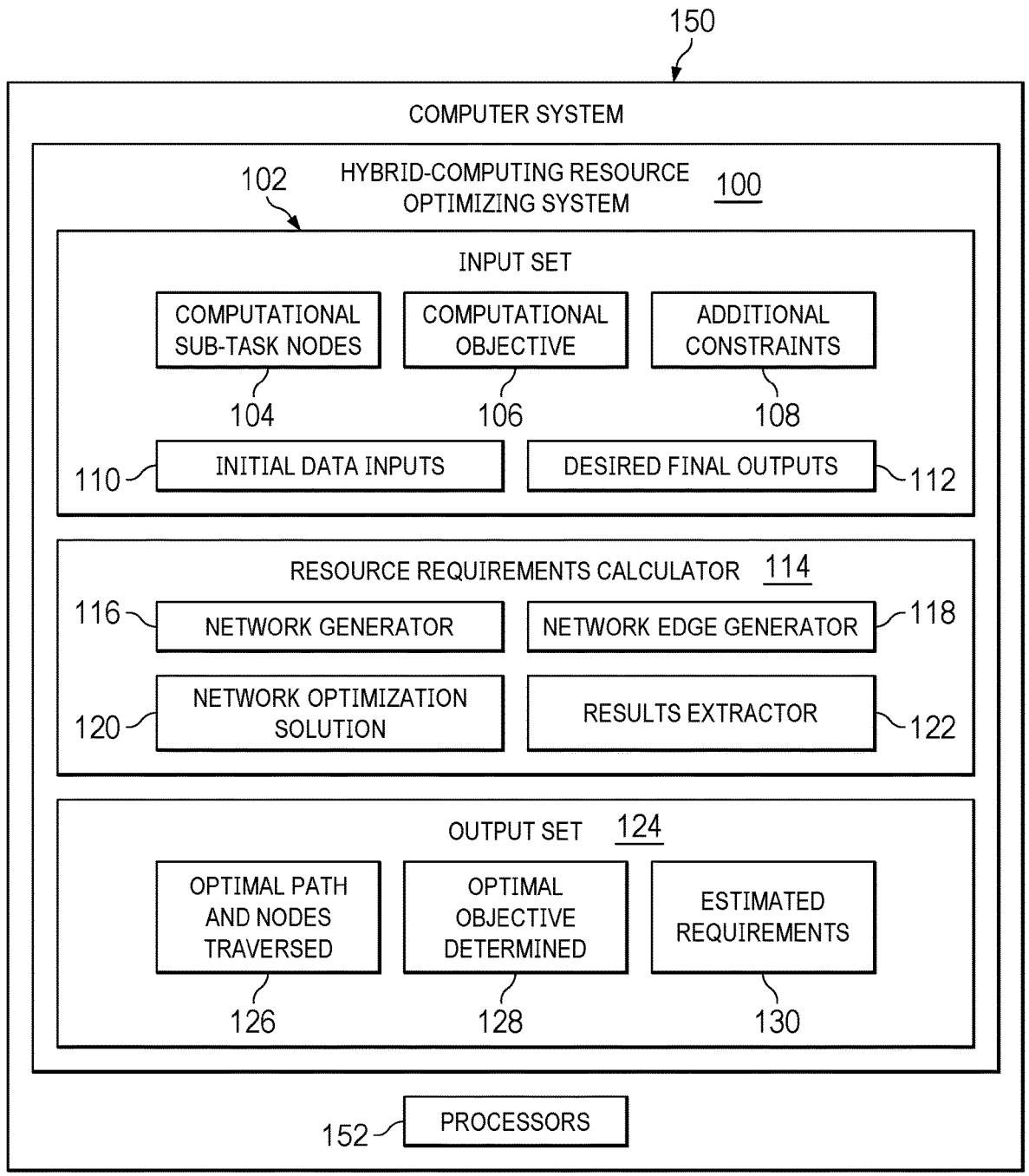
FIG. 1 depicts a block diagram illustrating a hybrid-computing resource optimization system in accordance with an illustrative embodiment.

The illustrative embodiments recognize and take into account one or more different considerations. The illustrative embodiments recognize and take into account that hybrid arrangements of classical and quantum computing resources have been identified as a means of leveraging the best capabilities of one resource vs. another.

The illustrative embodiments also recognize and take into account that current hybrid computational approaches are devised by hand, usually by researchers exploring the use and adoption of new hardware or new computational sub-processes. Hybrid classical/quantum algorithms have been successfully proposed in the literature, but their discovery was performed through a trial-and-error research process. As hardware continues to change and improve, the best available hybrid approach will change as well.

The illustrative embodiments also recognize and take into account that identification of migration from one computing approach to another often relies on heavy benchmarking and comparison of the different methods available. This approach does not provide a quantitative estimate of when a transition should occur or why but merely provides a binary comparison outcome based on the benchmark used.

The illustrative embodiments provide a method for determining a best arrangement of computational sub-processes to accomplish a larger computational task. The sub-processes may use different computing resources such as classical and quantum computing, which can be combined into an optimal hybrid-computation approach to solving problems.

The illustrative embodiments determine the optimal ordered arrangement of steps for a computational process, given a set of potential sub-processes. The sub-processes are each characterized by a set of required inputs and a set of produced outputs, as well as computational time required, the error rates associated with the sub-process and the amount of resources required. The illustrative embodiments can be applied to any hybrid computing processes such as hybrid classical/quantum computing, analog/digital computing and may include sub-processes such as high-performance computing, FPGA, neuromorphic computing, DNA or chemical computing, optical computing, or any future emerging form of computing technology.

The illustrative embodiments can also be used to study how the optimal solution changes with changing available resources or error rates. For example, the process could be run multiple times with an increasing amount of quantum resources allowed at each run. This approach may reveal at what point a transition from one form of computing to another might be most beneficial for minimizing computational time, minimizing error associated with the overall computation, or maximizing resource usage. For example, this process would help reveal at what point to migrate from a classical or hybrid classical/quantum approach to a fully quantum approach. The migration may be prompted by the fact that a computational speedup using the new approach is available and/or that the error rate associated with the new approach is at least the same or better.

Turning now to FIG. 1, an illustration of a block diagram of a hybrid-computing resource optimization system is depicted in accordance with an illustrative embodiment. Hybrid-computing resource optimizing system 100 comprises input set 102, resource requirements calculator 114, and output set 124.

Input set 102 includes a set of computational sub-task nodes 104 representing potential components of a computational process. Each node within computational sub-task nodes 104 may include a representation of the resource requirements, time requirement, required input set, produced output set, and error rates for that respective sub-task. Input set 102 also comprises computational objective 106 for a computational process such as, e.g., minimize computational time, minimize resources required, maximize accuracy/minimize error, maximize resource usage, or any combination thereof. Input set 102 may include optional user-provided constraints 108 such as, e.g., specific nodes cannot exceed resource usage larger than a specified maximum resources available, error of total computation cannot exceed a maximum acceptable error bound, etc. Input set 102 includes initial data inputs 110 and the desired final outputs 112 produced by the computational process based on the initial data inputs 110.

Resource requirements calculator 114 comprises network generator 116, which generates a network representation of the provided computation sub-task nodes 104 and their constituent information. Network edge generator 118 generates edge connections between nodes in the network produced by network generator 116 wherein two nodes, A and B, are connected by a directed edge from A to B if the produced outputs of node A can serve as the required inputs to node B.

Network optimization solution 120 solves an optimization to determine a best path through the directed edge network according to the computational objective 106. A starting node (or set of starting nodes) is identified, which is any node in the network whose required inputs are identical to the initial data inputs 110 provided in input set 102. A final node (or set of final nodes) is identified, which is any node in the network whose final outputs are identical to the desired final outputs 112 provided in input set 102. If there are multiple starting/ending nodes, multiple network optimization problems can be generated and solved either sequentially or in parallel to determine the full amount. Network problems (spanning all starting/ending nodes) are solved for the computational objective 106 subject to any additional constraints 108 supplied. The solution may implement different approaches such as, e.g., shortest-path, lowest-cost, network flow, decision tree, or Steiner tree.

If more than one network instance was solved, objectives are compared to determine the best solution.

Results extractor 122 receives the best network solution from 120. Results extractor 122 post-processes data from the resulting best solution to produce output set 124.

Output set 124 includes the actual optimal path determined and nodes traversed 126 through the sub-processes to achieve the computational process result and the objective value determined 128. Output set 124 may also comprise estimated requirements 130 such as, e.g., total error expected in the solution, total resources required, total computational time to solve the problem, etc.

Hybrid-computing resource optimizing system 100 can be implemented in software, hardware, firmware, or a combination thereof. When software is used, the operations performed by hybrid-computing resource optimizing system 100 can be implemented in program code configured to run on hardware, such as a processor unit. When firmware is used, the operations performed by hybrid-computing resource optimizing system 100 can be implemented in program code and data and stored in persistent memory to run on a processor unit. When hardware is employed, the hardware may include circuits that operate to perform the operations in hybrid-computing resource optimizing system 100.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for hybrid-computing resource optimizing system 100 can be located in computer system 150, which is a physical hardware system and includes one or more data processing systems. When more than one data processing system is present in computer system 150, those data processing systems are in communication with each other using a communications medium. The communications medium can be a network. The data processing systems can be selected from at least one of a computer, a server computer, a tablet computer, or some other suitable data processing system.

For example, hybrid-computing resource optimizing system 100 can run on one or more processors 152 in computer system 150. As used herein a processor is a hardware device and is comprised of hardware circuits such as those on an integrated circuit that respond and process instructions and program code that operate a computer. When processors 152 execute instructions for a process, one or more processors can be on the same computer or on different computers in computer system 150. In other words, the process can be distributed between processors 152 on the same or different computers in computer system 150. Further, one or more processors 152 can be of the same type or different type of processors 152. For example, one or more processors 152 can be selected from at least one of a single core processor, a dual-core processor, a multi-processor core, a general-purpose central processing unit (CPU), a graphics processing unit (GPU), a quantum processing unit (QPU), tensor processing unit, a digital signal processor (DSP), field programmable gate array (FPGA), neuromorphic processor, or some other type of processor.

A generic computational process can be broken into a series of subtasks, $T_i = \{R_i, t_i, S_i, U_i, E_i\}$, where a single subtask $T_i$ is comprised of:
- a required set of resources, $R_i$
- an amount of time or computational intensity, $t_i$
- a required set of inputs, $S_i$
- a produced set of outputs, $U_i$
- potentially a representation of error associated with the outputs, $E_i$ There will generally be a known starting set of data, G, some desired final product of data, H, and a selected ordering of processes to complete the subtasks. The resources, $R_i$, and the amount of time or intensity, $t_i$, may be scalar (as in the amount of bits/qubits and/or processors required for subtask $T_i$) or could be more functional (such as two functions $R_i(n)$ and $t_i(n)$ that describe the scaling of the resources and time required with a growing problem size, n).

Error associated with the outputs, $E_i$, could similarly be zero for an exact process, a scalar value, a Gaussian distribution, could be a noise model, or could be a function of a problem size or problem complexity, $E_i(n)$.

The illustrative embodiments optimize the ordering of computational sub-tasks to complete the full computational process, while using the smallest amount of computational time, resources, or final output error (or some combination of these). Additionally, there may be constraints present on the problem such as the ordering of the sub-tasks to create appropriate outputs that become inputs for the following sub-tasks. There may be additional constraints applied, such as available resource limits or maximum acceptable error limits on particular sub-tasks. The error propagation from one sub-task to the next does not need to be restricted to a linear sum but may include more accurate nonlinearities of the propagation.

An example problem of interest to which the illustrative embodiments may be applied is the computation of corrosion rates and modeling of micro-scale interactions of aerospace materials in harsh environments and studying the usage of classical and quantum computer resources to solve this problem.

Figure 2:
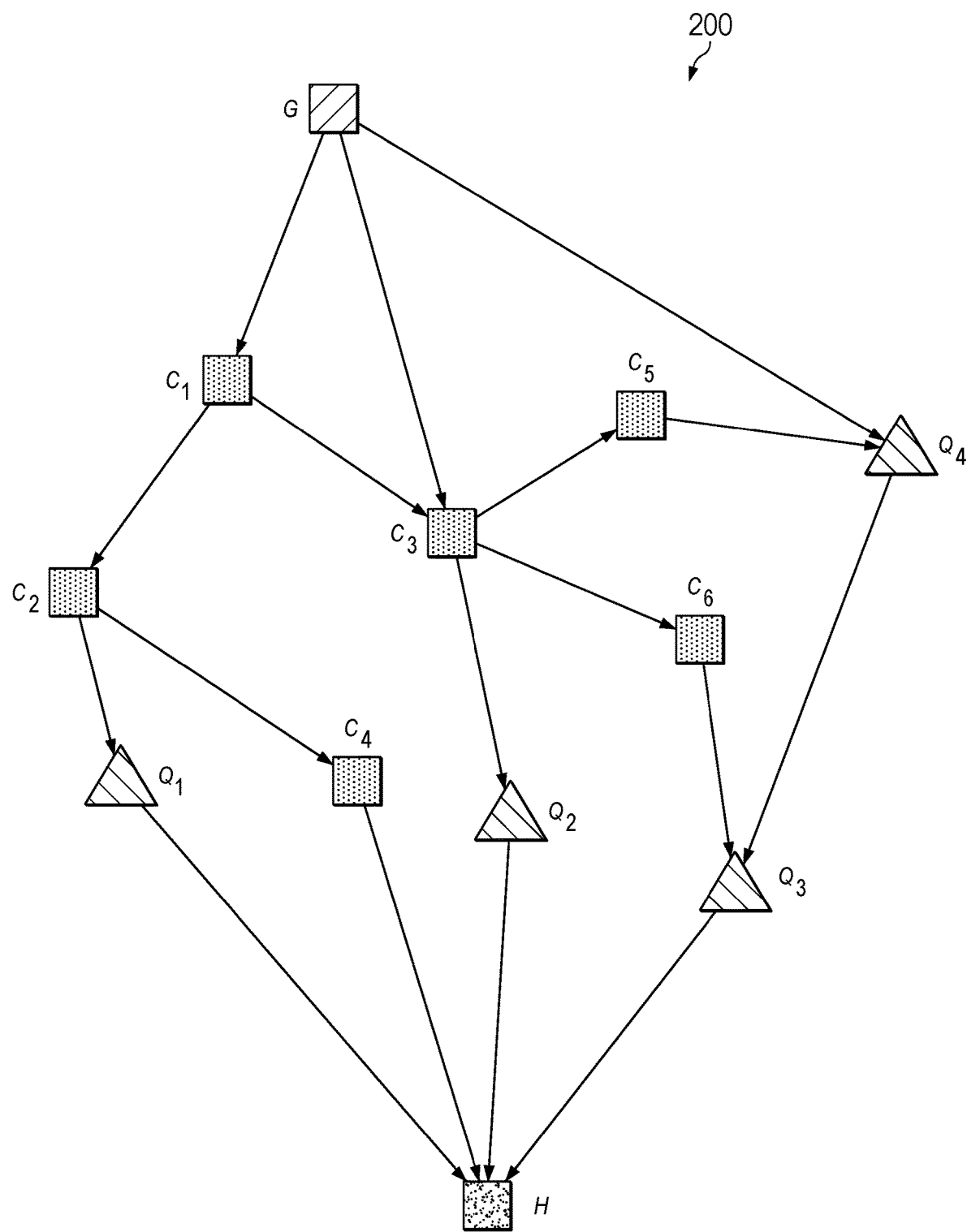
FIG. 2 depicts a directed graph network for a computational process in accordance with an illustrative embodiment.

FIG. 2 depicts a directed graph network for a computational process in accordance with an illustrative embodiment. Directed graph network 200 may be an example of a network created by network generator 116 and network edge generator 118 in FIG. 1.

The computational process can be represented as a graph where nodes represent sub-task execution using a specific process. Each node in the graph, $n_i$, represents a potential computational sub-task, $T_i$, that could be executed en route to completing the computational process from initial starting set of data, G, to a desired final set of data, H. In the present example, the computational sub-task nodes comprise classical nodes $C_1$, $C_2$, $C_3$, $C_4$, $C_5$, $C_6$ and quantum nodes $Q_1$, $Q_2$, $Q_3$, $Q_4$. The classical nodes, $C_i$, represent any classical procedures that can be used. The classical approaches, $C_i$, may include methods such as discrete Fourier transform (DFT), kinetic Monte Carlo (kMC), and any pre-processing or post-processing steps that could be performed. The quantum nodes, $Q_i$, represent any quantum processes that can be run.

The illustrative embodiments seek to find the "shortest path" (lowest cost) across the directed graph network 200 starting from any node requiring inputs equal to the initial starting data inputs, $S_0 = G$, to any node that produces the final desired output data $U_N = H$. Additional constraints ensure that edges between nodes are only allowed to exist if the outputs of one node may feed into the inputs of the next.

This process may be extended beyond just the usage of classical and quantum resources to include manual or laboratory processes, or other forms of emerging computing, such as analog/digital hybrid computing, DNA computing, optical computing, neuromorphic computing, etc. Laboratory measurement processes that could provide some of the needed values for the full process may also be added to the graph if reasonable estimates of equivalent resources/time/error are available. Additional constraints may be added to the problem formulation to represent parallelization of tasks using splitting of output and input data across edges in the graph. The formulations could be used to minimize the total computation time, to minimize the propagation of error, or to maximize best usage of resources available.

One possible formulation applied to the directed graph network 200 comprises an optimization approach to minimize the total computation time while ensuring that all resources required for the problem are available and also ensuring that the error of the final calculated result is within an acceptable maximum error bound. In this formulation, given initial data G and desired final output H, the optimization process minimizes total time required:

$$\Sigma_i t_i$$

subject to, total error of the full process must be less than a maximum acceptable error, $E_{max}$:

$$\Pi_i E_i < E_{max}$$

resources used at each node must be available:

$$R_i < R_i^{available}, \forall i$$

first process must use initial data:

$$S_0 = G$$

and final data produced must be the desired final output:

$$U_N = H$$

Alternately the optimization process may solve the problem to realize the most accurate possible result, as long as the resources required for each computational sub-task are available and the total computation time is below some acceptable limit. Any reformulation could be created based on constrained combinations of the error rates, resources, and/or time. Therefore, given initial data G and desired final output H, the optimization time would minimize total propagated error of the final result:

$$\Pi_i E_i$$

subject to, total computational time must be less than a specified upper limit, $t_{max}$:

$$\Sigma_i t_i < t_{max}$$

resources used at each node must be available:

$$R_i < R_i^{available}, \forall i$$

first process must use initial data:

$$S_0 = G$$

and final data produced must be the desired final output:

$$U_N = H$$

Additionally, a specific formulation of the network problem may be rerun with varying parameters such, e.g., as varying the maximum resources of a particular hardware type available, varying the error rates associated with particular computational sub-tasks available on the graph, etc., to better understand how the optimal choice of an algorithmic stack would transition from one hardware to another based on error.

Figure 3:
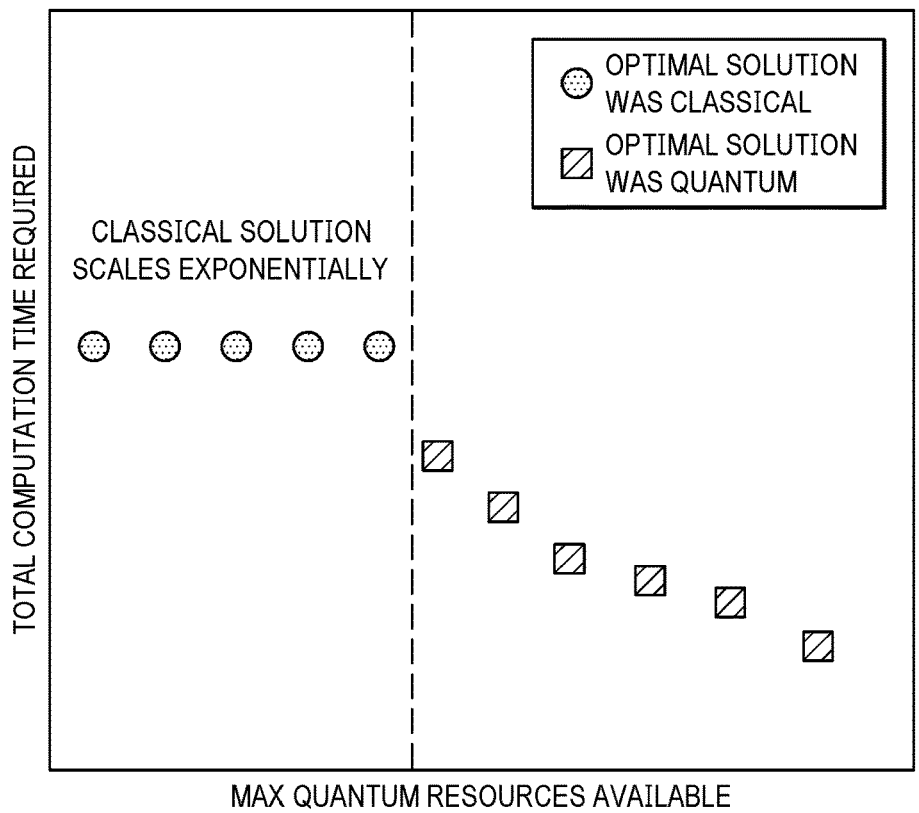
FIG. 3 depicts graphs illustrating examples of computation time and accuracy resulting from different allocations of hybrid resources in accordance with an illustrative embodiment.
Figure 3:
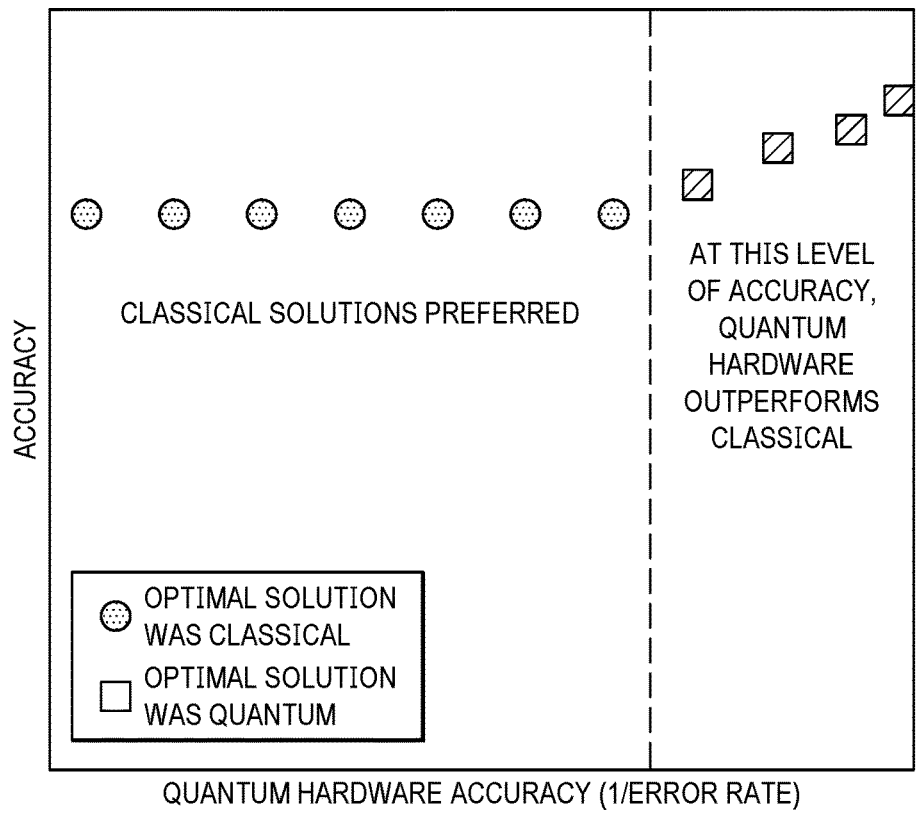

FIG. 3 depicts graphs illustrating examples of computation time and accuracy resulting from different allocations of hybrid resources in accordance with an illustrative embodiment. FIG. 3 may be an example of the application of the two optimization formulations described above.

If one of the above formulations was chosen, the formulation could be solved across multiple problem instances. For example, the minimum-time formulation could be solved over multiple, increasing problem sizes or quantum resources available. The resulting multiple solutions could be plotted as shown in FIG. 3. This plot would represent a pareto front of optimal solutions that can reveal where the transition from one algorithmic process to another would be most beneficial, based on parameters such error rates, resources, computation time, and problem size.

FIGS. 4-8 depict diagrams illustrating the application of hybrid-computing resource allocation to an example logical network. The example shown in FIGS. 4-8 is an application to quantum chemistry but can be applied to other phenomena and modeling applications.

Figure 4:
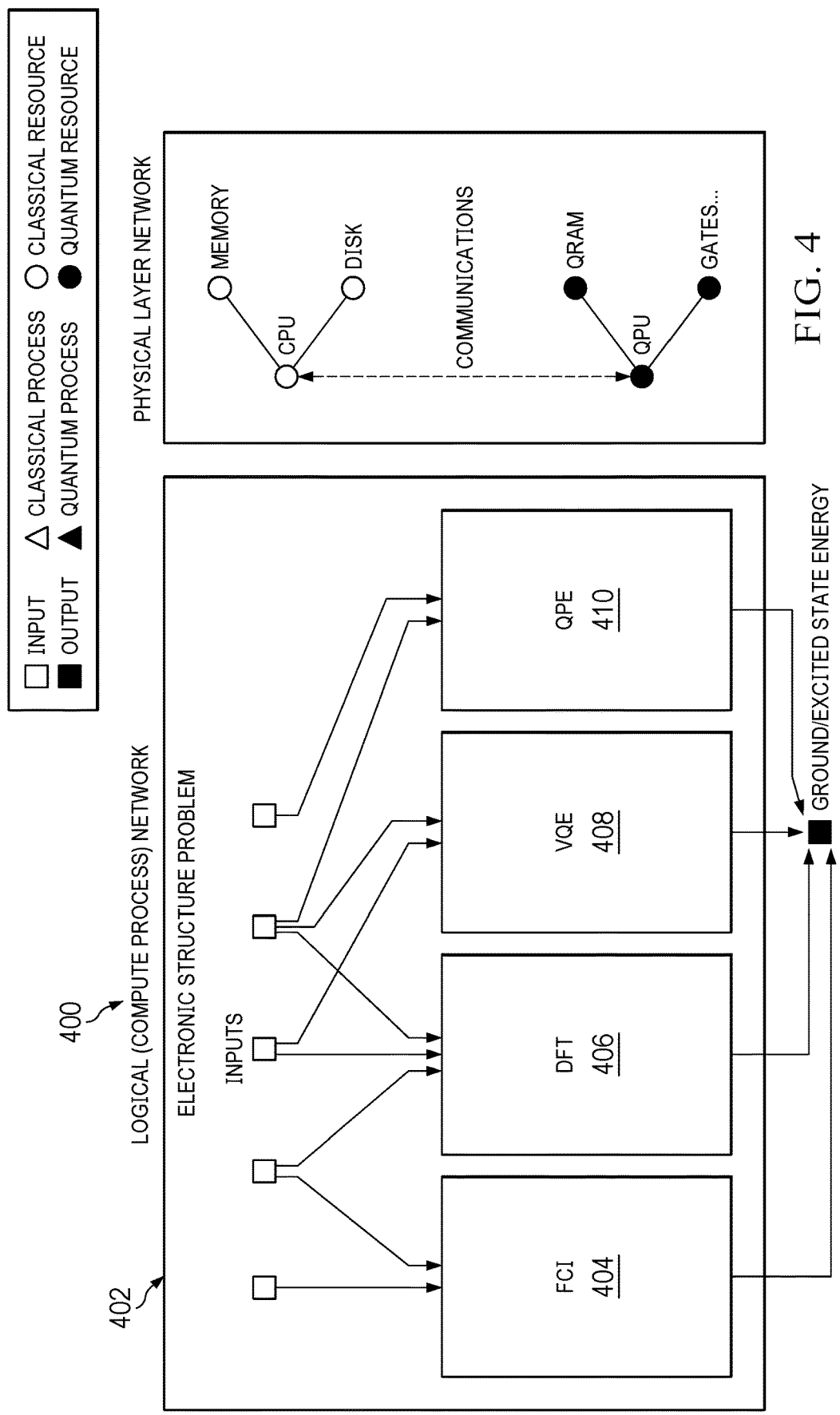
FIG. 4 depicts a diagram illustrating a logical network and its relation to hardware in accordance with an illustrative embodiment.

FIG. 4 depicts a diagram illustrating a logical network and its relation to hardware in accordance with an illustrative embodiment. The logical network 400 comprises an electronic structure problem 402 which may include full configuration interaction (FCI) 404, density functional theory (DFT) 406, Variational Quantum Eigensolver (VQE) 408, and quantum phase estimation (QPE) 410. Each approach has its advantages and disadvantages.

FCI 404 is a classical, hard approach that is most accurate but does not scale well. DFT 406 is a classical approximation of FCI. DFT scales better than FCI but does not scale well for very large problem sizes. VQE 408 is a hybrid classical-quantum algorithm that scales better than FCI and DFT but is not necessarily faster than classical methods, and VQE's accuracy is not fully understood. QPE 410 is a pure quantum algorithm that scales well and has proven speedup over classical algorithms, but the necessary circuitry depth for implementing QPE is deeper than present physical hardware allows due to noise.

Figure 5:
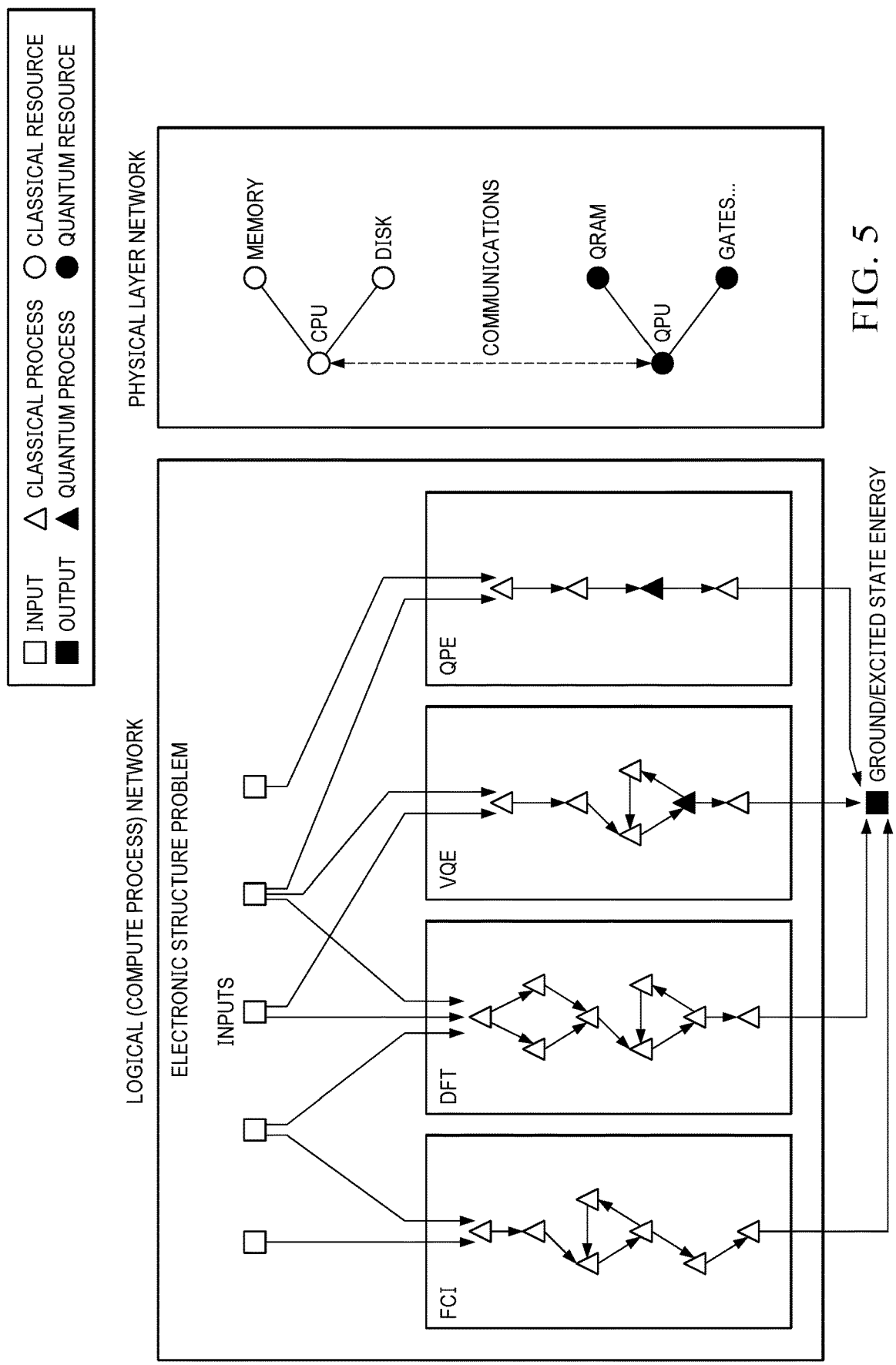
FIG. 5 depicts a diagram illustrating addition of nodes to the logical network in accordance with an illustrative embodiment.

FIG. 5 depicts a diagram illustrating addition of nodes to the logical network in accordance with an illustrative embodiment. Each approach may be broken down by adding nodes representing computational sub-tasks. In addition, some of the sub-task nodes may be available to all possible algorithms (not shown in this example).

Figure 6:
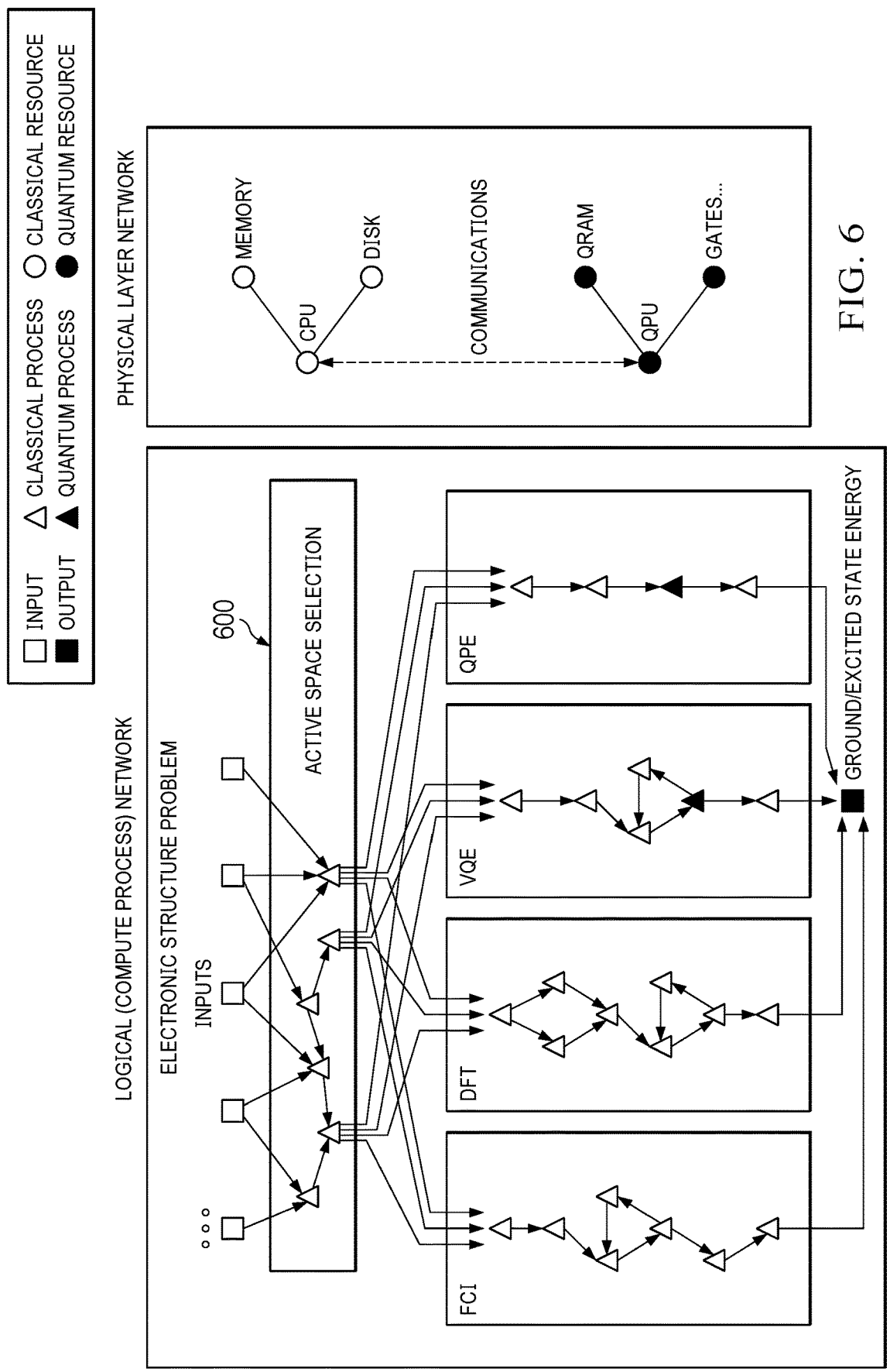
FIG. 6 depicts a diagram illustrating the addition of preprocessing to the logical network in accordance with an illustrative embodiment.

FIG. 6 depicts a diagram illustrating the addition of preprocessing to the logical network in accordance with an illustrative embodiment. In this example, active space selection 600 is added as a pre-computation that can help narrow down the space of full solutions. As shown in the example, active space selection 600 is available to all of the methods.

Figure 7:
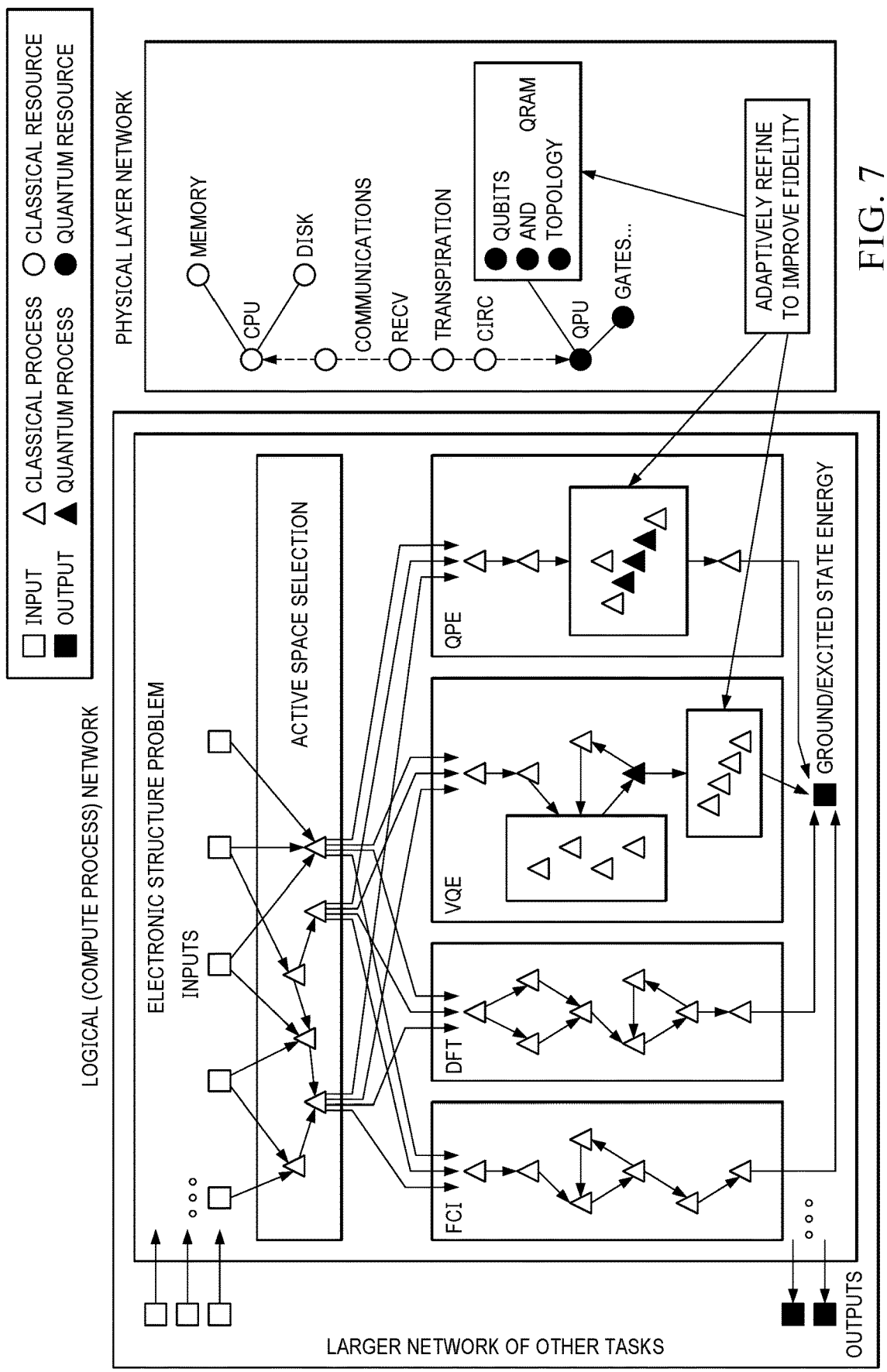
FIG. 7 depicts a diagram illustrating adaptive refinement of the logical network in accordance with an illustrative embodiment.

FIG. 7 depicts a diagram illustrating adaptive refinement of the logical network in accordance with an illustrative embodiment. FIG. 7 illustrates how different levels of granularity that may be applied in the optimization problem. Individual computational sub-task nodes can be further broken down into constituent processes to improve fidelity.

It should also be noted that the present example is focused on the ground state electronic problem. As shown in FIG. 7, this problem may itself be a constituent step (node) in a larger network of other computational tasks such as, e.g., corrosion reactions, wherein multiple ground state energies must be computed to determine the reaction enthalpy.

Figure 8A:
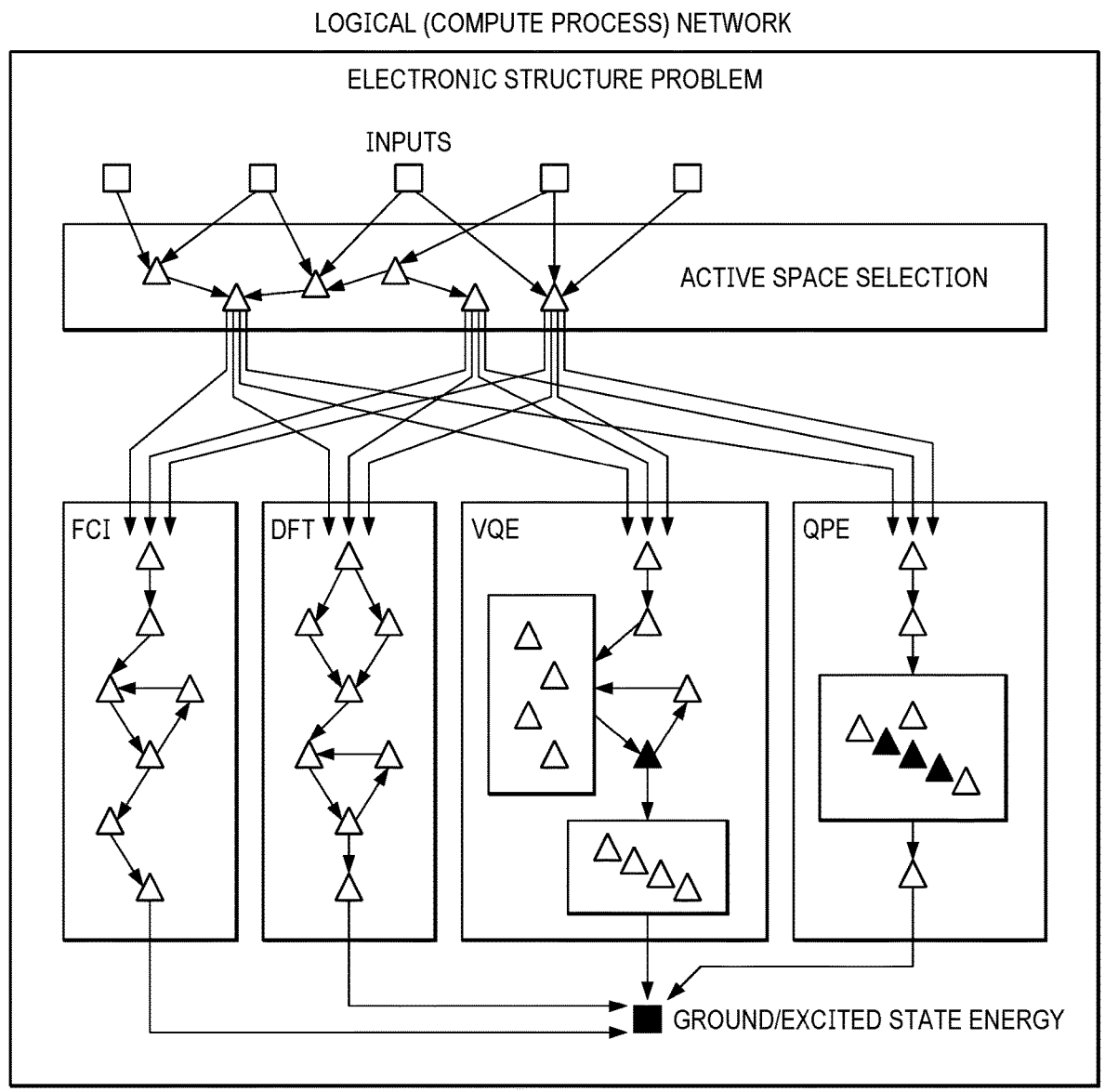
FIG. 8A depicts a diagram illustrating a logical network used for an analysis approach to simulate hardware behavior in accordance with an illustrative embodiment.
Figure 8B:
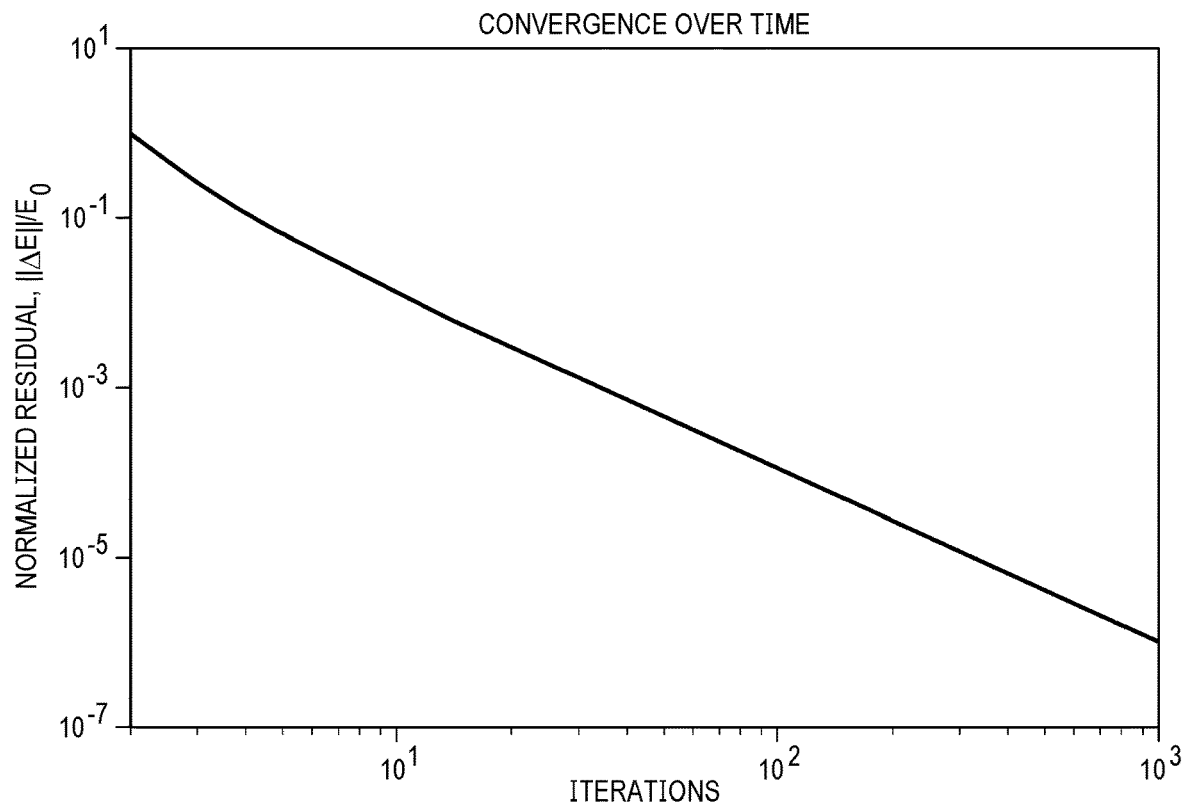
FIG. 8B depicts a diagram illustrating simulated logical behavior of a workflow over time in accordance with an illustrative embodiment.
Figure 8B:
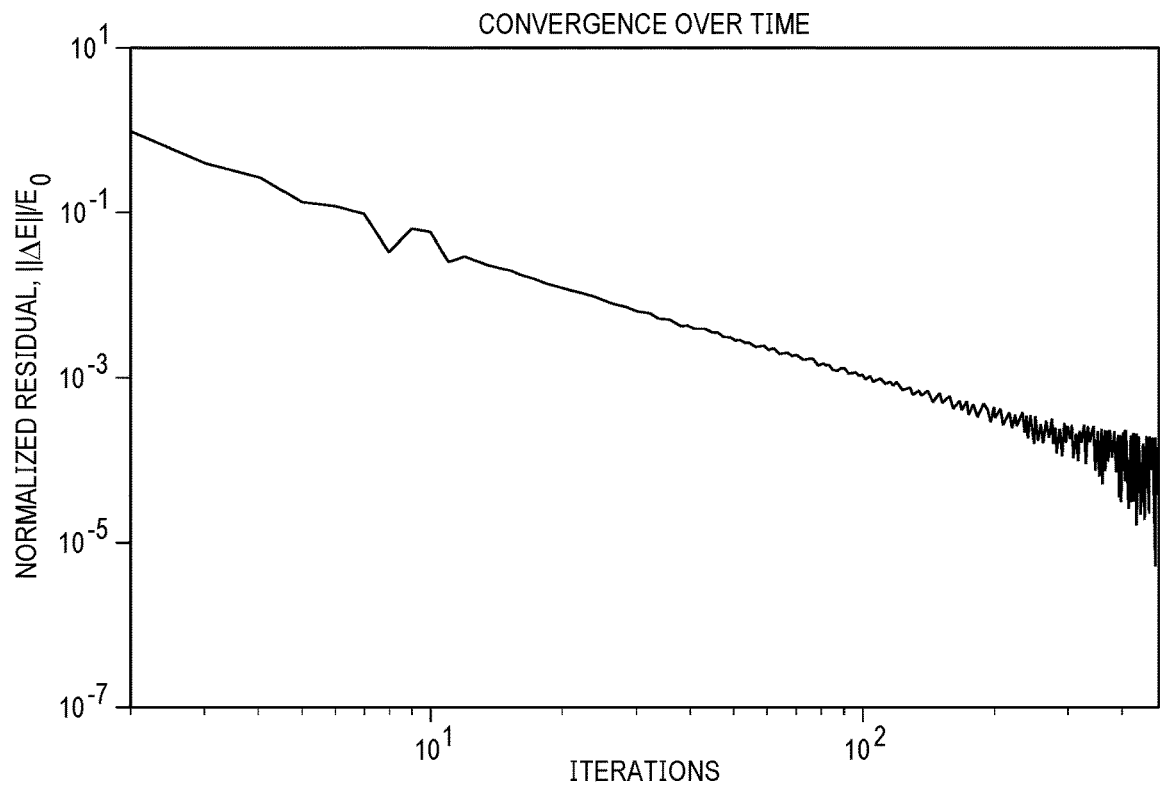
Figure 8C:
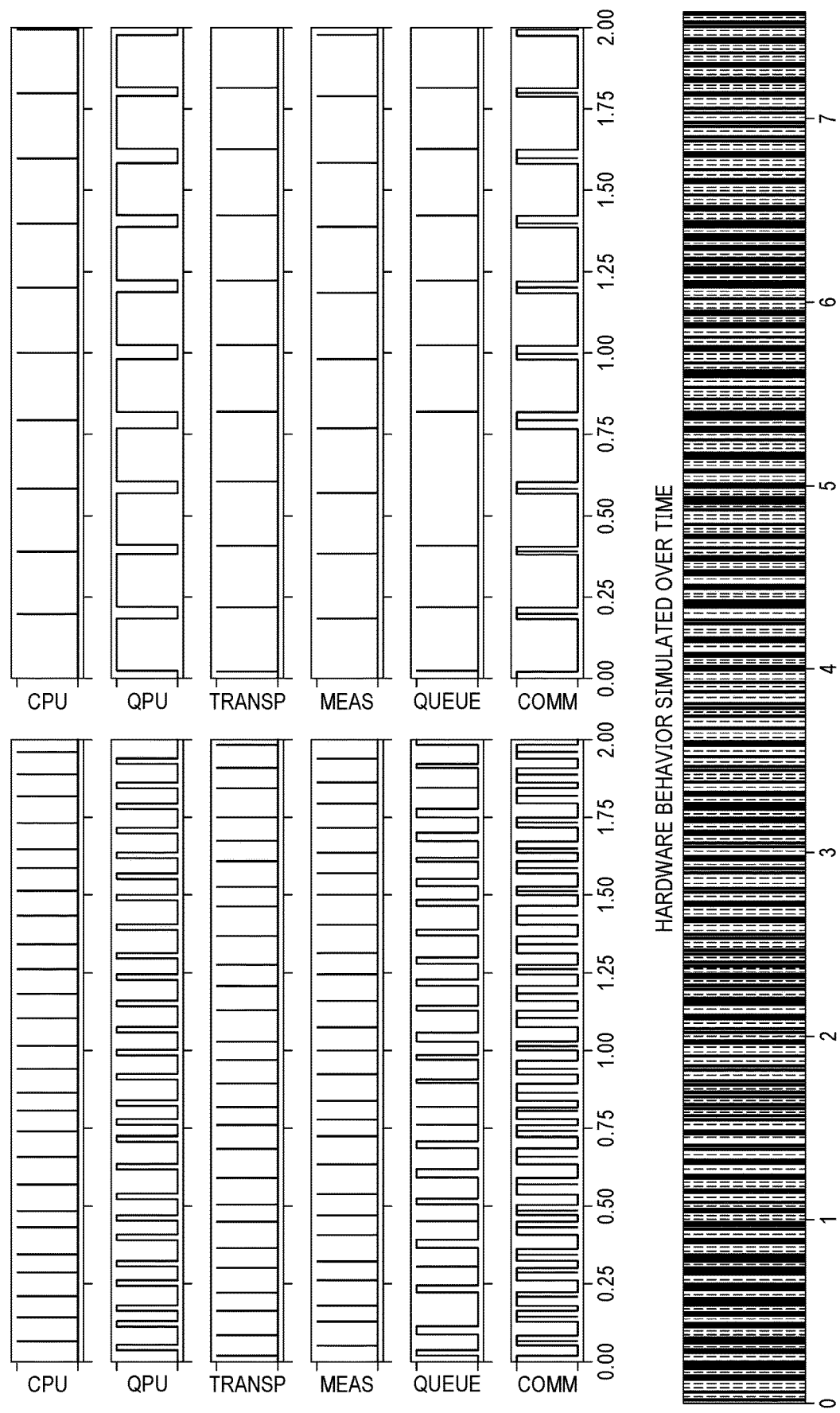
FIG. 8C depicts a diagram illustrating simulated hardware behavior of the logical network in accordance with an illustrative embodiment.

FIGS. 8A, 8B, and 8C depict diagrams illustrating an analysis approach to simulate hardware behavior of the logical network in accordance with an illustrative embodiment. The analysis approach is used to simulate the behavior of the algorithm's usage of hardware. In contrast to optimization, the analysis approach assumes the best path workflow through the graph network as a given. Given an ordered set of computational sub-tasks, the analysis approach processes the attached hardware to execute a full end-to-end computational process and simulates the hardware behavior to calculate the resulting time, accuracy, etc. The graphs in FIGS. 8B and 8C show simulated logical behavior of a workflow over time and how much resources are used over time for the assumed mode of operation.

Figure 9:
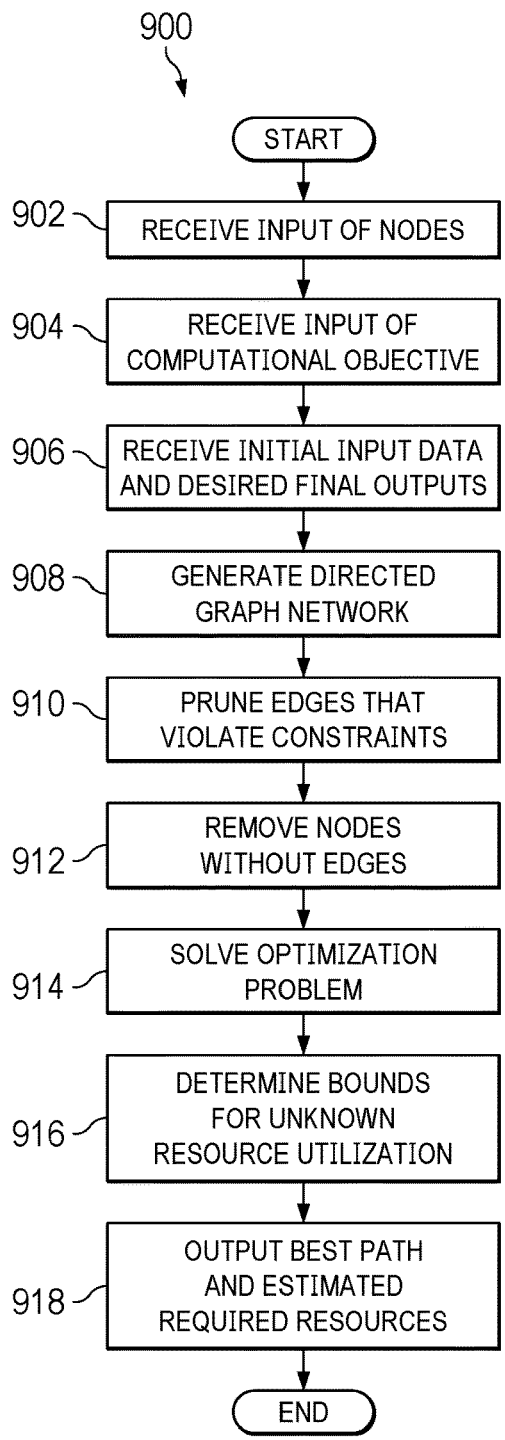
FIG. 9 depicts a flow diagram illustrating a process of arranging computational sub-tasks in a hybrid-computing environment in accordance with an illustrative embodiment.

FIG. 9 depicts a flow diagram illustrating a process of arranging computational sub-tasks in a hybrid-computing environment in accordance with an illustrative embodiment. Process 900 can be implemented in hardware (including quantum computer hardware), software, or both. When implemented in software, the process can take the form of program code that is run by one of more processor units located in one or more hardware devices in one or more computer systems. Process flow 900 may be implemented in hybrid-computing resource optimization system 100 shown in FIG. 1.

Process 900 begins by receiving input of a number of user-provided nodes (operation 902). Each node may represent a computational sub-task. The nodes may be grouped into different sets according to differing computing resources used by the nodes. Each node may comprise required inputs, produced outputs, resource utilization, required time or computational intensity, and error rates.

Resource utilization may include the type of processor such as central processing unit (CPU), graphics processing unit (GPU), tensor processing unit (XPU), or quantum processing unit (QPU), qubit count in the case of a QPU, type of memory such as random access memory (RAM), read only memory (ROM), cache, or quantum register memory, how much memory the node has, access costs, how much network traffic the node generates, and network links to other hardware such as FGPA, neuromorphic chips, etc.

There may be resource utilizations by particular computational sub-tasks that are "unknown." For example, in quantum computing, the Variational Quantum Eigensolver (VQE) algorithm is a very popular algorithm but is poorly characterized in terms of error and time requirement, due to its highly heuristic nature. For such algorithms, there may not be a good quantitative estimate for specification and use in the network. Any unknown resource utilization at a node may be treated as a variable in the optimization problem to be solved or bounded.

The system receives a computational objective (operation 904). The computational objective may comprise at least one of minimizing total error or a specified form of error (e.g., minimize decoherence or measurement error on a particular device), minimizing computational time requirement, minimizing computational budget requirement, minimize resource utilization, or maximizing resource utilization (e.g., maximize qubit count). The system may also enforce a number of user-specified constraints for achieving the computational objective. The constraints may comprise at least one of time constraints, resource constraints, or error constraints, e.g., the time requirement for any solution must be less than a specified maximum, specified maximum resource availability, etc.

The system also receives initial data inputs and desired final outputs (operation 906). The user may optionally specify any restrictions on inputs that the final problem solution cannot use. The desired final output is the output that should be produced by the resulting optimization problem solution.

It should be understood that operations 902, 904, and 906 do not have to occur in the order shown and could occur concurrently.

The system generates a directed graph network comprising the nodes and directed edges connecting the nodes (operation 908). Starting with an empty graph, the system adds each user-provided computational sub-task as a separate node. For each node, the system identifies all other nodes that require the output of that node as part of their required inputs. Therefore, each directed edge in the directed graph network connects a first node to a second node, wherein the first node comprises a produced output that is a required input for the second node. The initial data inputs and desired final outputs may be included as explicit nodes in the network. The initial input and final output edges may be precomputed and then the initial input and final output nodes stripped from the directed graph network to improve speed for determining the remainder of the workflow over a smaller network.

The nodes representing the computational sub-tasks may be connected to a second group of nodes in a second network, wherein the second network represents physical connections to hardware devices available for each computational sub-task.

Process 900 might prune edges that violate user-specified constraints from the directed graph network (operation 910). The system may generate a set of paths through the nodes, which might comprise all paths, especially for a small network, or a subset of paths that include nodes considered high-risk by the user. By traversing the edges of each path, the system can identify edge transitions that violate user-specified constraints and remove those edges.

The system then removes nodes from the directed graph network that have no edge connections after the edges that violate the user-specified constraints have been pruned (operation 912).

An optimization problem is then solved to determine a best path through the directed graph network for deriving the desired final outputs from the initial data inputs according to the computational objective, wherein the best path comprises a subset of nodes and directed edges within the directed graph network (operation 914). The optimization problem may comprise at least one of integer optimization, shortest path, least cost, network flow, decision tree, or Steiner tree.

After solving the optimization problem, process 900 may determine bounds for any unknown resource utilization (operation 916). For example, if there is a hard constraint on error, the system can use the rest of the known errors for other nodes to determine any bounds that must be placed on error for a node with unknown resource utilization.

The system outputs to a user the best path to achieve the computational objective and estimated computational resources required for the best path (operation 918). Process 900 then ends.

Figure 10:
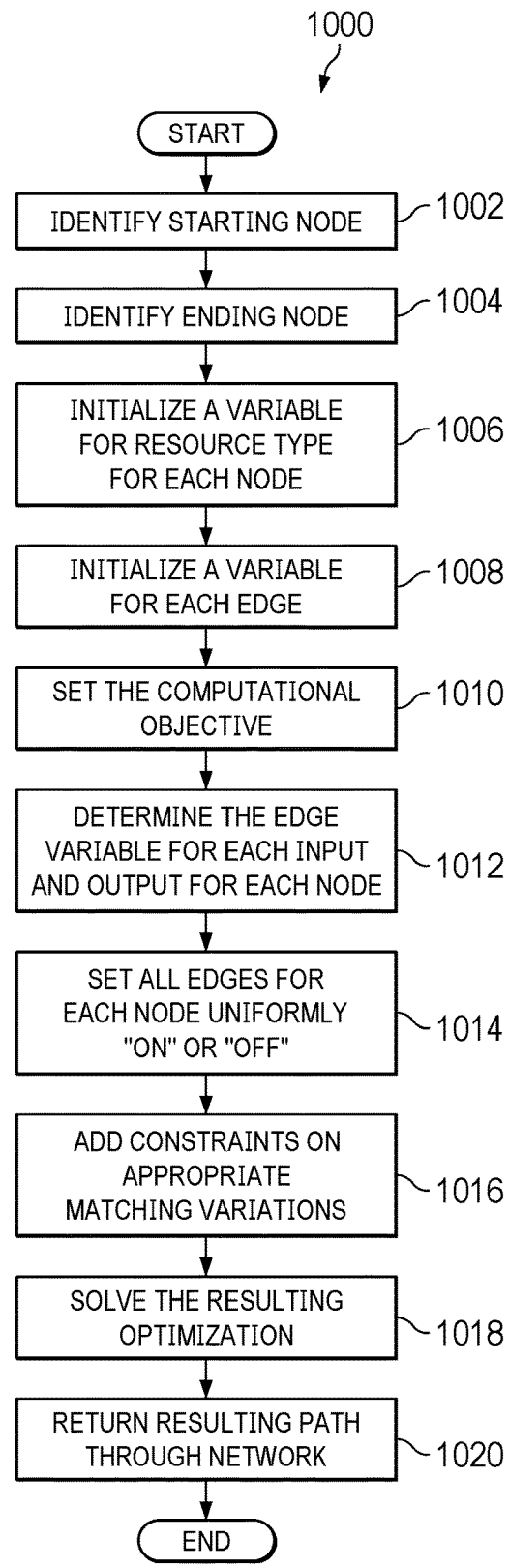
FIG. 10 depicts a flow diagram illustrating a process of solving an optimization problem in accordance with an illustrative embodiment.

FIG. 10 depicts a flow diagram illustrating a process of solving an optimization problem in accordance with an illustrative embodiment. Process 1000 is a detailed example of operation 914 in FIG. 9. In the present example, process 1000 implements integer optimization, but it should be understood that other implementations are possible for operation 914.

Process 1000 begins by identifying a starting node in the directed graph network whose required inputs are identical to the initial data (operation 1002). The system also identifies an ending node in the directed graph network whose produced outputs are identical to the desired final outputs (operation 1004).

The system then determines an ordered set of nodes in the directed graph network from the starting node to the ending node needed to transform the initial data to the desired final outputs according to the computational objective. The system initializes a variable for each user-specified resource type for each computational sub-task node (operation 1006) and then initializes a variable for each edge in the directed graph network (operation 1008). The system sets the user-specified computational objective as the target for the optimization problem (operation 1010).

For each computational sub-task node, the system determines the edge variable for each input and each output on the node (operation 1012) and adds a constraint requiring all edges for the inputs and outputs on the node to be uniformly set "on" or "off" (operation 1014). This constraint constrains the node to either not be chosen in the final resulting solution or be turned "on" but requires that the inputs be provided and the outputs be produced.

User-specified hard constraints are then added on the appropriate matching variations (operation 1016). For example, to calculate the electronic ground state, it may be desirable to impose a requirement to solve within chemical accuracy (e.g., 1 kcal/mol). Therefore, a constraint may be added on the error of all edges associated with the final electronic ground state output result requiring that the total accumulated error is less than this value.

The system then solves the resulting optimization (operation 1018). The system returns the resulting path of edges through the directed graph network (operation 1020). Process 1000 then ends.

Figure 11:
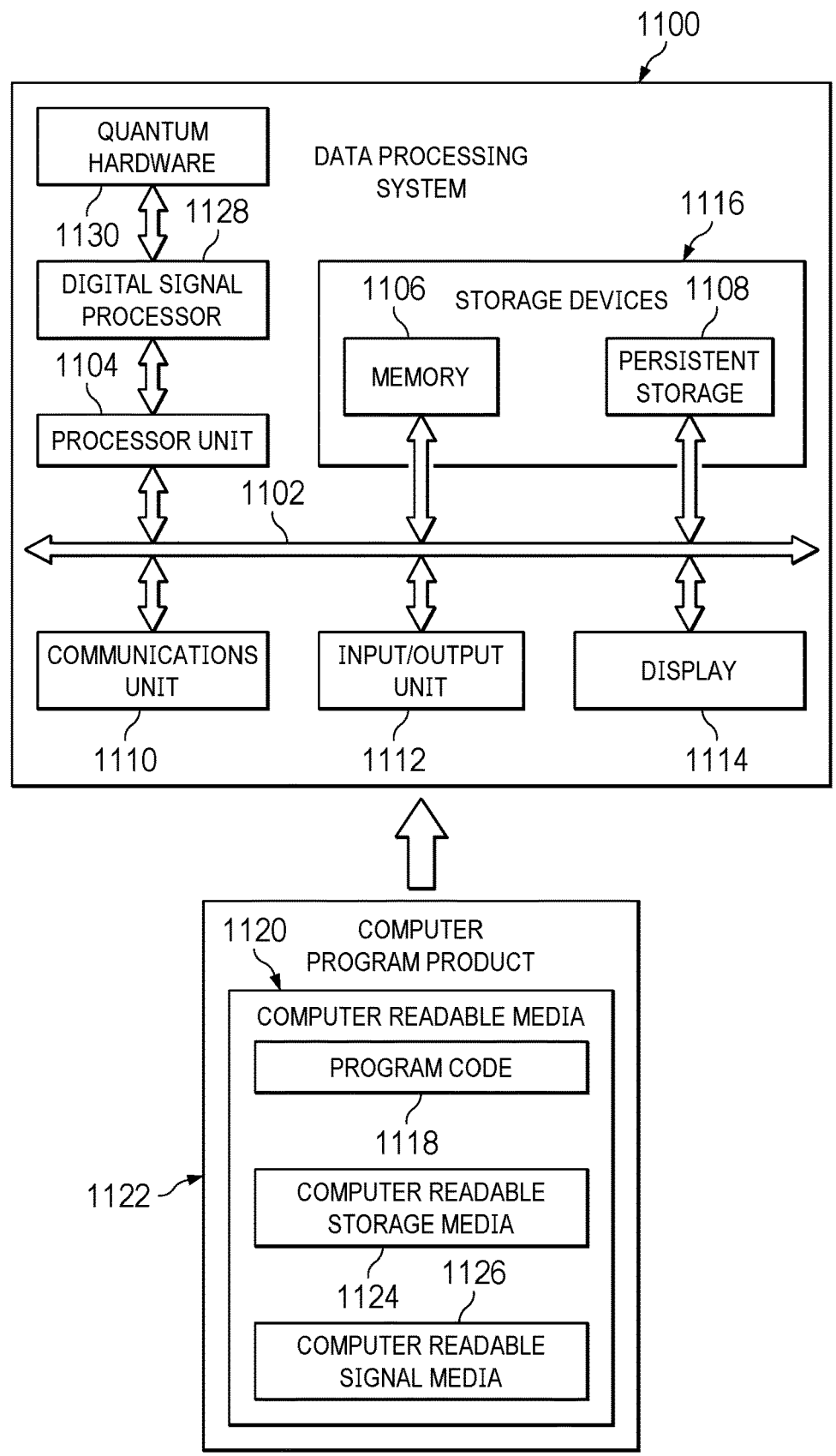
FIG. 11 depicts a block diagram of a data processing system in accordance with an illustrative embodiment.

Turning now to FIG. 11, an illustration of a block diagram of a data processing system is depicted in accordance with an illustrative embodiment. Data processing system might be an example of computer system 150 in FIG. 1. Data processing system 1100 might be used to implement one or more computers to carry out process operations shown in FIGS. 4-10. In this illustrative example, data processing system 1100 includes communications framework 1102, which provides communications between processor unit 1104, memory 1106, persistent storage 1108, communications unit 1110, input/output unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation. In an embodiment, processor unit 1104 comprises one or more conventional general-purpose central processing units (CPUs). Processor unit 1104 may send instructions to and from digital signal processor (DSP) 1128. DSP 1128 in turn sends analog or hybrid signals to and from quantum hardware 1130.

Quantum hardware 1130 may comprise quantum circuits based on qubits (quantum bits). Qubits are traditionally used to simulate a 1 or 0 state, or in a superposition of the 1 and 0 states. However, when measured, the qubit may be in an infinite number of states depending on the qubit's quantum state immediately prior to measurement when using a Bloch sphere representation. The quantum circuits may comprise a number of reversible quantum gates in which computational processes are logically reversible.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108. Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer-usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. Computer program product 1122 might be for aligning reference frames for an augmented reality (AR) display. In one example, computer-readable media 1120 may be computer-readable storage media 1124 or computer-readable signal media 1126.

In these illustrative examples, computer-readable storage media 1124 is a physical or tangible storage device used to store program code 1118 rather than a medium that propagates or transmits program code 1118. Alternatively, program code 1118 may be transferred to data processing system 1100 using computer-readable signal media 1126.

Computer-readable signal media 1126 may be, for example, a propagated data signal containing program code 1118. For example, computer-readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implement method for arranging computational sub-tasks in a hybrid-computing environment, the method comprising:
using a number of processors to perform the operations of:
receiving input of a number of nodes, wherein each node represents a computational sub-task, and wherein the nodes are grouped into different sets according to differing computing resources used by the nodes, wherein the differing computing resources include classical computing resources and quantum computing resources;
receiving a computational objective for a modeling application;
receiving initial data inputs and desired final outputs;
generating a directed graph network comprising the nodes and directed edges connecting the nodes;
solving an optimization problem to determine a best path through the directed graph network for deriving the desired final outputs from the initial data inputs according to the computational objective, wherein the best path comprises a subset of nodes and directed edges within the directed graph network, and wherein the subset of nodes represents an allocation of computational sub-tasks between classical computing resources and quantum computing resources;
running the optimization problem multiple times with varying parameters to determine an optimal transition between classical and quantum hardware types; and
executing a full end-to-end computational process according to the best path to simulate hardware behavior of the directed graph network.

2. The method of claim 1, wherein each node comprises:
required inputs;
produced outputs;
resource utilization;
required time or computational intensity; and
error rates.

3. The method of claim 2, wherein the resource utilization comprises at least one of:
type of processor;
qubit count;
type of memory;
amount of memory;
access costs;
network links to hardware; or
generated network traffic.

4. The method of claim 2, wherein resource utilization is unknown.

5. The method of claim 4, wherein any unknown resource utilization at a node is treated as a variable in the optimization problem.

6. The method of claim 4, further comprising, after solving the optimization problem, determining bounds for any unknown resource utilization.

7. The method of claim 1, wherein the computational objective comprises at least one of:
   minimizing total error;
   minimizing a specified form of error;
   minimizing computational time requirement;
   minimizing computational budget requirement;
   minimize resource utilization; or
   maximizing resource utilization.

8. The method of claim 1, further comprising enforcing a number of constraints for achieving the computational objective, wherein the constraints comprise at least one of:
   time constraints;
   resource constraints; or
   error constraints.

9. The method of claim 1, further comprising:
   pruning edges that violate user-specified constraints from the directed graph network; and
   removing nodes from the directed graph network that have no edge connections after the edges that violate the user-specified constraints have been pruned.

10. The method of claim 1, wherein each directed edge in the directed graph network connects a first node to a second node, wherein the first node comprises a produced output that is a required input for the second node.

11. The method of claim 1, wherein the optimization problem comprises at least one of:
    integer optimization;
    shortest path;
    least cost;
    network flow;
    decision tree; or
    Steiner tree.

12. The method of claim 1, wherein solving the optimization problem comprises:
    identifying a starting node in the directed graph network whose required inputs are identical to the initial data;
    identifying an ending node in the directed graph network whose produced outputs are identical to the desired final outputs; and
    determining an ordered set of nodes in the directed graph network from the starting node to the ending node needed to transform the initial data to the desired final outputs according to the computational objective.

13. The method of claim 1, wherein the nodes are connected to a second number of nodes in a second network, wherein the second network represents physical connections to hardware devices available for each computational sub-task.

14. A system for arranging computational sub-tasks in a hybrid-computing environment, the system comprising:
    a storage device configured to store program instructions; and
    one or more processors operably connected to the storage device and configured to execute the program instructions to cause the system to:
       receive input of a number of nodes, wherein each node represents a computational sub-task, and wherein the nodes are grouped into different sets according to differing computing resources used by the nodes, wherein the differing computing resources include classical computing resources and quantum computing resources;
       receive a computational objective for a modeling application;
       receive initial data inputs and desired final outputs;
       generate a directed graph network comprising the nodes and directed edges connecting the nodes;
       solve an optimization problem to determine a best path through the directed graph network for deriving the desired final outputs from the initial data inputs according to the computational objective, wherein the best path comprises a subset of nodes and directed edges within the directed graph network, and wherein the subset of nodes represents an allocation of computational sub-tasks between classical computing resources and quantum computing resources;
       run the optimization problem multiple times with varying parameters to determine an optimal transition between classical and quantum hardware types; and
       execute a full end-to-end computational process according to the best path to simulate hardware behavior of the directed graph network.

15. The system of claim 14, wherein each node comprises:
    required inputs;
    produced outputs;
    resource utilization;
    required time or computational intensity; and
    error rates.

16. The system of claim 15, wherein the resource utilization comprises at least one of:
    type of processor;
    qubit count;
    type of memory;
    amount of memory;
    access costs;
    network links to hardware; or
    generated network traffic.

17. The system of claim 15, wherein resource utilization is unknown.

18. The system of claim 17, wherein any unknown resource utilization at a node is treated as a variable in the optimization problem.

19. The system of claim 17, wherein, after solving the optimization problem, the processors further execute instructions to determine bounds for any unknown resource utilization.

20. The system of claim 14, wherein the computational objective comprises at least one of:
    minimizing total error;
    minimizing a specified form of error;
    minimizing computational time requirement;
    minimizing computational budget requirement;
    minimize resource utilization; or
    maximizing resource utilization.

21. The system of claim 14, wherein the processors further execute instructions to enforce a number of constraints for achieving the computational objective, wherein the constraints comprise at least one of:
    time constraints;
    resource constraints; or
    error constraints.

22. The system of claim 14, wherein the processors further execute instructions to:
    prune edges that violate user-specified constraints from the directed graph network; and
    remove nodes from the directed graph network that have no edge connections after the edges that violate the user-specified constraints have been pruned.

23. The system of claim 14, wherein each directed edge in the directed graph network connects a first node to a second node, wherein the first node comprises a produced output that is a required input for the second node.

24. The system of claim 14, wherein the optimization problem comprises at least one of:
- integer optimization;
- shortest path;
- least cost;
- network flow;
- decision tree; or
- Steiner tree.

25. The system of claim 14, wherein solving the optimization problem comprises:
- identifying a starting node in the directed graph network whose required inputs are identical to the initial data;
- identifying an ending node in the directed graph network whose produced outputs are identical to the desired final outputs; and
- determining an ordered set of nodes in the directed graph network from the starting node to the ending node needed to transform the initial data to the desired final outputs according to the computational objective.

26. The system of claim 14, wherein the nodes are connected to a second number of nodes in a second network, wherein the second network represents physical connections to hardware devices available for each computational sub-task.

27. A computer program product for arranging computational sub-tasks in a hybrid-computing environment, the computer program product comprising:
- a computer-readable storage medium having program instructions embodied thereon to perform the steps of:
  - receiving input of a number of nodes, wherein each node represents a computational sub-task, and wherein the nodes are grouped into different sets according to differing computing resources used by the nodes, wherein the differing computing resources include classical computing resources and quantum computing resources;
  - receiving a computational objective for a modeling application;
  - receiving initial data inputs and desired final outputs;
  - generating a directed graph network comprising the nodes and directed edges connecting the nodes;
  - solving an optimization problem to determine a best path through the directed graph network for deriving the desired final outputs from the initial data inputs according to the computational objective, wherein the best path comprises a subset of nodes and directed edges within the directed graph network, and wherein the subset of nodes represents an allocation of computational sub-tasks between classical computing resources and quantum computing resources;
  - running the optimization problem multiple times with varying parameters to determine an optimal transition between classical and quantum hardware types; and
  - executing a full end-to-end computational process according to the best path to simulate hardware behavior of the directed graph network.

28. The computer program product of claim 27, wherein each node comprises:
- required inputs;
- produced outputs;
- resource utilization;
- required time or computational intensity; and
- error rates.

29. The computer program product of claim 28, wherein the resource utilization comprises at least one of:
- type of processor;
- qubit count;
- type of memory;
- amount of memory;
- access costs;
- network links to hardware; or
- generated network traffic.

30. The computer program product of claim 28, wherein resource utilization is unknown.

31. The computer program product of claim 30, wherein any unknown resource utilization at a node is treated as a variable in the optimization problem.

32. The computer program product of claim 30, further comprising instructions for, after solving the optimization problem, determining bounds for any unknown resource utilization.

33. The computer program product of claim 27, wherein the computational objective comprises at least one of:
- minimizing total error;
- minimizing a specified form of error;
- minimizing computational time requirement;
- minimizing computational budget requirement;
- minimize resource utilization; or
- maximizing resource utilization.

34. The computer program product of claim 27, further comprising enforcing a number of constraints for achieving the computational objective, wherein the constraints comprise at least one of:
- time constraints;
- resource constraints; or
- error constraints.

35. The computer program product of claim 27, further comprising instructions for:
- pruning edges that violate user-specified constraints from the directed graph network; and
- removing nodes from the directed graph network that have no edge connections after the edges that violate the user-specified constraints have been pruned.

36. The computer program product of claim 27, wherein each directed edge in the directed graph network connects a first node to a second node, wherein the first node comprises a produced output that is a required input for the second node.

37. The computer program product of claim 27, wherein the optimization problem comprises at least one of:
- integer optimization;
- shortest path;
- least cost;
- network flow;
- decision tree; or
- Steiner tree.

38. The computer program product of claim 27, wherein solving the optimization problem comprises:
- identifying a starting node in the directed graph network whose required inputs are identical to the initial data;
- identifying an ending node in the directed graph network whose produced outputs are identical to the desired final outputs; and
- determining an ordered set of nodes in the directed graph network from the starting node to the ending node needed to transform the initial data to the desired final outputs according to the computational objective.

39. The computer program product of claim 27, wherein the nodes are connected to a second number of nodes in a second network, wherein the second network represents physical connections to hardware devices available for each computational sub-task.

40. The method of claim 1, wherein the modeling application comprises computation of corrosion rates and microscale interactions of aerospace materials in hard environments.

* * * * *

UNITED STATES PATENT AND TRADEMARK OFFICE
CERTIFICATE OF CORRECTION

| | | |
|---|---|---|
| PATENT NO. | : 12,265,853 B2 | Page 1 of 1 |
| APPLICATION NO. | : 17/664063 | |
| DATED | : April 1, 2025 | |
| INVENTOR(S) | : Richard Joel Thompson et al. | |

It is certified that error appears in the above-identified patent and that said Letters Patent is hereby corrected as shown below:

In the Claims

Column 14, Line 9, Claim 1 correct "computer-implement" to read -- computer-implemented --;
Column 15, Line 7, Claim 7 correct "minimize resource" to read -- minimizing resource --;
Column 16, Line 48, Claim 20 correct "minimize resource" to read -- minimizing resource --;
Column 18, Line 26, Claim 33 correct "minimize resource" to read -- minimizing resource --.

Signed and Sealed this
Twentieth Day of May, 2025

Coke Morgan Stewart
*Acting Director of the United States Patent and Trademark Office*